United States Patent
Nam et al.

(10) Patent No.: US 11,728,944 B2
(45) Date of Patent: Aug. 15, 2023

(54) REFERENCE SIGNAL RESOURCE CONFIGURATION

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/248,077

(22) Filed: Jan. 7, 2021

(65) Prior Publication Data
US 2021/0218529 A1    Jul. 15, 2021

Related U.S. Application Data

(60) Provisional application No. 62/959,674, filed on Jan. 10, 2020.

(51) Int. Cl.
*H04W 4/00* (2018.01)
*H04L 5/00* (2006.01)
*H04W 74/08* (2009.01)

(52) U.S. Cl.
CPC ....... *H04L 5/0048* (2013.01); *H04W 74/0833* (2013.01)

(58) Field of Classification Search
CPC ............... H04L 5/0048; H04L 5/0091; H04W 74/0833; H04W 52/0209; Y02D 30/70
(Continued)

(56) References Cited

U.S. PATENT DOCUMENTS

| 11,218,353 B2 * | 1/2022 | Chen | H04B 7/0695 |
| 2014/0016614 A1 * | 1/2014 | Velev | H04W 36/14 |
| | | | 370/331 |

(Continued)

FOREIGN PATENT DOCUMENTS

| CN | 110690947 A * | 1/2020 | |
| WO | WO-2019028849 A1 * | 2/2019 | ........ H04W 52/0225 |

OTHER PUBLICATIONS

Ericsson: "CSI-RS Usage by RRC INACTIVE and RRC IDLE UEs", 3GPP Draft, 3GPP TSG-RAN WG2 NR AH#3, R2-1800349, CSI-RS Usage by RRC-IDLE and or RRC-Inactive UES, 3rd Generation Partnership Project (3GPP), Mobile Competence Centre, 650, Route Des Lucioles, F-06921 Sophia-Antipolis Cedex, vol. RAN WG2, No. Vancouver, Canada, Jan. 22, 2018-Jan. 26, 2018, Jan. 11, 2018 (Jan. 11, 2018), XP051385679, 2 Pages, Retrieved from the Internet: URL: http://www.3gpp.org/ftp/tsg%5Fran/WG2% 5FRL2/TSGR2%5FAHs/2018%5F01%5FNR/Docs/. [retrieved on Jan. 11, 2018] section 2.

(Continued)

*Primary Examiner* — Maharishi V Khirodhar
(74) *Attorney, Agent, or Firm* — Harrity & Harrity, LLP / Qualcomm

(57) ABSTRACT

Various aspects of the present disclosure generally relate to wireless communication. In some aspects, a user equipment (UE) may transmit, using a random access channel transmission and when operating in an idle mode or inactive mode, a request for information identifying a reference signal configuration; and selectively receive, as a response to the request and based at least in part on a mode of the UE, the information identifying the reference signal configuration for reception of a reference signal, wherein the reference signal is a channel state information reference signal or (Continued)

a tracking reference signal. Numerous other aspects are provided.

24 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0205528 A1* | 7/2018 | Bai | ....................... | H04L 5/0092 |
| 2018/0220392 A1* | 8/2018 | Ly | ......................... | H04W 64/00 |
| 2018/0227848 A1* | 8/2018 | Lee | ................... | H04W 72/0446 |
| 2019/0379509 A1* | 12/2019 | Stauffer | ............... | H04L 5/0048 |
| 2021/0218454 A1* | 7/2021 | Nam | ..................... | H04L 5/0091 |
| 2022/0110085 A1* | 4/2022 | Khoryaev | ............ | H04L 5/0051 |
| 2022/0330260 A1* | 10/2022 | Wu | ..................... | H04W 72/042 |

OTHER PUBLICATIONS

Intel Corporation: "Remaining Details on TRS", 3GPP Draft, R1-1717376, 3GPP TSG RAN WG1 Meeting 90bis, Remaining Details on TRS, 3rd Generation Partnership Project (3GPP), Mobile Competence Centre; 650, Route Des Lucioles, F-06921 Sophia-Antipolis Cedex, France, vol. RAN WG1, No. Prague, CZ, Oct. 9, 2017-Oct. 13, 2017, Oct. 3, 2017, XP051352599, Retrieved from the Internet: URL:http://www.3gpp.org/ftp/tsg_ran/WG1_RL1/TSGR1_90b/Docs/ [retrieved on Oct. 3, 2017], 4 pages.

International Search Report and Written Opinion—PCT/US2021/070017—ISA/EPO—dated May 18, 2021.
Mediatek Ericsson ZTE Sanechips Qualcomm CHTTL Intel Spreadtrum: "WF on TRS Design", 3GPP Draft, 3GPP TSG RAN WG1 Meeting ad]hoc#3, R1-1716841, WF on TRS Design V10, 3rd Generation Partnership Project (3GPP), Mobile Competence Centre, 650, Route Des Lucioles, F-06921 Sophia-Antipolis Cedex, France, vol. RAN WG1. No. Nagoya, Japan, Sep. 18, 2017-Sep. 21, 2017, Sep. 25, 2017 (Sep. 25, 2017), XP051353926, 6 Pages, Retrieved from the Internet: URL: http://www.3gpp.org/ftp/tsg_ran/WG1_RL1/TSGR1_AH/NR_AH_1709/Docs/. [retrieved on—Sep. 25, 2017] p. 5.
Spreadtrum Communications: "Remaining Issues on TRS", 3GPP Draft, 3GPP TSG RAN WG1 Meeting 90bis, R1-1717747, Remaining Issues on TRS-Final, 3rd Generation Partnership Project (3GPP), Mobile Competence Centre; 650, Route Des Lucioles; F-06921 Sophia-Antipolis Cedex, France, vol. RAN WG1, No. Prague. CZ, Oct. 9, 2017-Oct. 13, 2017, Oct. 8, 2017, XP051340932, Retrieved from the Internet: URL:http://www.3gpp.org/ftp/Meetings_3GPP_SYNC/RAN1/Docs/ [retrieved on Oct. 8, 2017], 6 pages.
ZTE: et al., "Discussion on UE Power Saving for Rel-17", 3GPP Draft, 3GPP TSG RAN Meeting #86, RP-192569, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 2, 2019 (Dec. 2, 2019), XP051834217, 5 Pages, Retrieved from the Internet: URL: https://ftp.3gpp.org/tsg_ran/TSG_RAN/TSGR_86/Docs/RP-192569.zip. RP-192569 -Discussion on UE power saving for Rel-17.docx [retrieved on Dec. 2, 2019] p. 3. proposal 6.

* cited by examiner

REFERENCE SIGNAL RESOURCE CONFIGURATION

CROSS-REFERENCE TO RELATED APPLICATION

This Patent application claims priority to U.S. Provisional patent Application No. 62/959,674, filed on Jan. 10, 2020, entitled "REFERENCE SIGNAL RESOURCE CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reference signal resource configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment (UE), may include transmitting, using a random access channel transmission and when operating in an idle mode or inactive mode, a request for information identifying a reference signal configuration; and selectively receiving, as a response to the request and based at least in part on a mode of the UE, the information identifying the reference signal configuration for reception of a reference signal, wherein the reference signal is a channel state information reference signal or a tracking reference signal.

In some aspects, a method of wireless communication, performed by a UE, may include transmitting, when operating in a connected mode, a request for information identifying a reference signal configuration; and selectively receiving, as a response to the request, the information identifying the reference signal configuration for reception of a reference signal, wherein the reference signal is a channel state information reference signal or a tracking reference signal.

In some aspects, a method of wireless communication, performed by a base station (BS), may include receiving, from a UE, a request for information identifying a reference signal configuration; and selectively transmitting, as a response to the request and to the UE, the information identifying the reference signal configuration for reception of a reference signal, wherein the reference signal is a channel state information reference signal or a tracking reference signal.

In some aspects, a UE for wireless communication may include memory and one or more processors operatively coupled to the memory. The memory and the one or more processors may be configured to transmit, using a random access channel transmission and when operating in an idle mode or inactive mode, a request for information identifying a reference signal configuration; and selectively receive, as a response to the request and based at least in part on a mode of the UE, the information identifying the reference signal configuration for reception of a reference signal, wherein the reference signal is a channel state information reference signal or a tracking reference signal.

In some aspects, a UE for wireless communication may include memory and one or more processors operatively coupled to the memory. The memory and the one or more processors may be configured to transmit, when operating in a connected mode, a request for information identifying a reference signal configuration; and selectively receive, as a response to the request, the information identifying the reference signal configuration for reception of a reference signal, wherein the reference signal is a channel state information reference signal or a tracking reference signal.

In some aspects, a B S for wireless communication may include memory and one or more processors operatively coupled to the memory. The memory and the one or more processors may be configured to receive, from a UE, a request for information identifying a reference signal configuration; and selectively transmit, as a response to the request and to the UE, the information identifying the reference signal configuration for reception of a reference signal, wherein the reference signal is a channel state information reference signal or a tracking reference signal.

In some aspects, a non-transitory computer-readable medium may store one or more instructions for wireless communication. The one or more instructions, when executed by one or more processors of a UE, may cause the one or more processors to: transmit, using a random access channel transmission and when operating in an idle mode or inactive mode, a request for information identifying a reference signal configuration; and selectively receive, as a response to the request and based at least in part on a mode of the UE, the information identifying the reference signal configuration for reception of a reference signal, wherein the reference signal is a channel state information reference signal or a tracking reference signal.

In some aspects, a non-transitory computer-readable medium may store one or more instructions for wireless communication. The one or more instructions, when executed by one or more processors of a UE, may cause the one or more processors to: transmit, when operating in a connected mode, a request for information identifying a reference signal configuration; and selectively receive, as a response to the request, the information identifying the reference signal configuration for reception of a reference signal, wherein the reference signal is a channel state information reference signal or a tracking reference signal.

In some aspects, a non-transitory computer-readable medium may store one or more instructions for wireless communication. The one or more instructions, when executed by one or more processors of a BS, may cause the one or more processors to: receive, from a UE, a request for information identifying a reference signal configuration; and selectively transmit, as a response to the request and to the UE, the information identifying the reference signal configuration for reception of a reference signal, wherein the reference signal is a channel state information reference signal or a tracking reference signal.

In some aspects, an apparatus for wireless communication may include means for transmitting, using a random access channel transmission and when operating in an idle mode or inactive mode, a request for information identifying a reference signal configuration; and means for selectively receiving, as a response to the request and based at least in part on a mode of the apparatus, the information identifying the reference signal configuration for reception of a reference signal, wherein the reference signal is a channel state information reference signal or a tracking reference signal.

In some aspects, an apparatus for wireless communication may include means for transmitting, when operating in a connected mode, a request for information identifying a reference signal configuration; and means for selectively receiving, as a response to the request, the information identifying the reference signal configuration for reception of a reference signal, wherein the reference signal is a channel state information reference signal or a tracking reference signal.

In some aspects, an apparatus for wireless communication may include means for receiving, from a UE, a request for information identifying a reference signal configuration; and means for selectively transmitting, as a response to the request and to the UE, the information identifying the reference signal configuration for reception of a reference signal, wherein the reference signal is a channel state information reference signal or a tracking reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
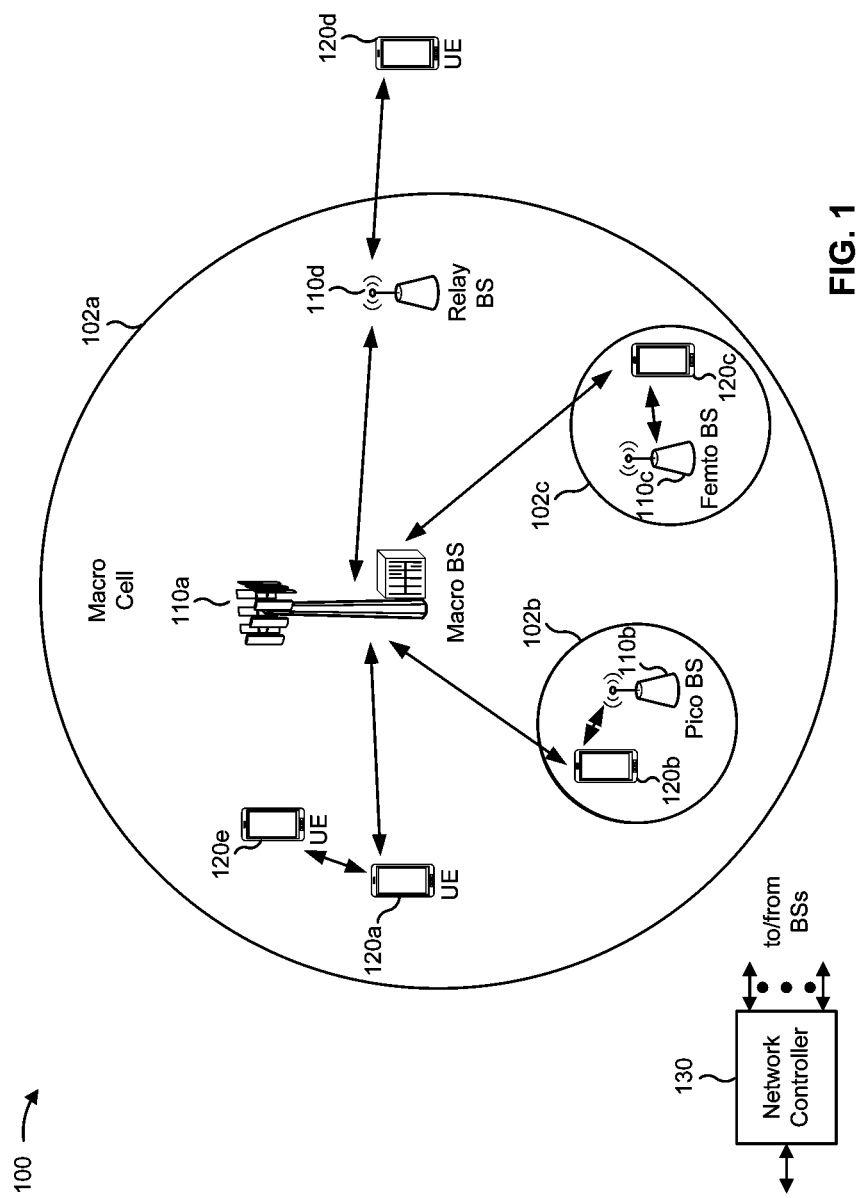
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
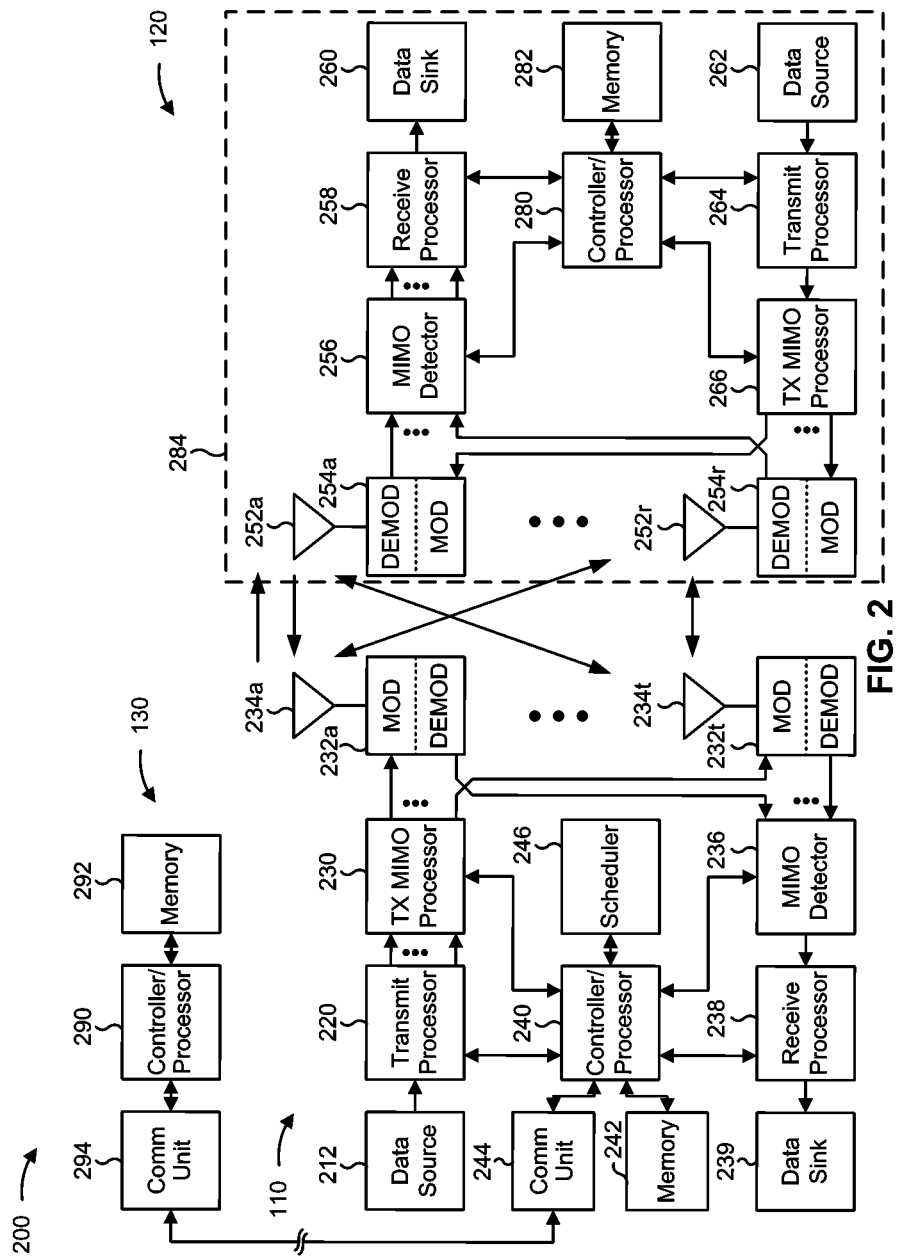
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signal resource configuration, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, process 600 of FIG. 6, and/or other processes as described herein. A scheduler 246 may schedule UEs for data transmission on the downlink and/or uplink.

In some aspects, UE 120 may include means for transmitting, using a random access channel transmission and when operating in an idle mode or inactive mode, a request for information identifying a reference signal configuration, means for selectively receiving, as a response to the request and based at least in part on a mode of the UE, the information identifying the reference signal configuration for reception of a reference signal, wherein the reference signal is a channel state information reference signal or a tracking reference signal, and/or the like. In some aspects, UE 120 may include means for transmitting, when operating in a connected mode, a request for information identifying a reference signal configuration, means for selectively receiving, as a response to the request, the information identifying the reference signal configuration for reception of a reference signal, wherein the reference signal is a channel state information reference signal or a tracking reference signal, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, a request for information identifying a reference signal configuration, means for selectively transmitting, as a response to the request and to the UE, the information identifying the reference signal configuration for reception of a reference signal, wherein the reference signal is a channel state information reference signal or a tracking reference signal, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, a UE may transfer from a connected mode, in which the UE uses a regular level of power, to an idle mode or an inactive mode, in which the UE uses a reduced level of power. This may enable increased battery life for the UE. In an idle mode or inactive mode, the UE may deactivate one or more functionalities to reduce power consumption, such as by monitoring to receive signaling during only a subset of symbols or slots. The BS and the UE may coordinate to ensure that the BS transmits information during the subset of symbols or slots during which the UE is configured to receive the information. For example, the UE may periodically monitor a paging channel to attempt to receive a paging message from the BS and the BS may transmit the paging message during a paging occasion when the UE is scheduled to monitor the paging channel.

In some cases, the BS may transmit a physical downlink control channel (PDCCH) with downlink control information (DCI) to indicate a corresponding physical downlink shared channel (PDSCH) on which a paging message is to be conveyed. To facilitate receipt of the paging message, the BS may transmit a reference signal and information for channel tracking, cell search, cell reselection, and/or the like. In LTE, a cell-specific reference signal (CRS) may be used by UEs in the idle mode. However, in NR, only a synchronization signal (SS) or physical broadcast channel (PBCH) block may be available for UEs in the idle mode or inactive mode. In some cases, a synchronization signal block (SSB) density (e.g., a frequency with which SSBs are transmitted by the BS) may be less than a threshold, which may result in a paging occasion being relatively far from a closest SSB. As a result, a length of time that the UE remains on between the closest SSB and a related paging occasion may be relatively long, which may result in an excessive use of power resources.

To reduce this delay between receipt of an SSB and a corresponding paging occasion, the BS may use additional reference signals, such as tracking reference signal (TRS) or channel state information reference signal (CSI-RS) resources, which are allocated for connected mode UEs, to provide signaling for idle mode or inactive mode UEs. However, in some cases, sharing of TRS or CSI-RS resources may still result in an excessive length of time for the UE to remain on. For example, when a cell is lightly loaded (e.g., less than a threshold amount of traffic is being conveyed on the cell for connected mode UEs), the network may lack allocated TRS or CSI-RS resources to share with idle mode or inactive mode UEs.

Some aspects described herein enable a UE to request reference signal resources to enable the UE to communicate (e.g., to receive paging) in an idle mode or an inactive mode. For example, when the UE is in the idle mode or inactive mode, the UE may transmit a random access channel (RACH) transmission using assigned RACH resources to request the reference signal resources. Additionally, or alternatively, when the UE is in a connected mode, the UE may transmit a radio resource control (RRC) message, a medium access control (MAC) control element (CE), an uplink control information (UCI), and/or the like to request reference signal resources for subsequent use in an idle mode or inactive mode. In this case, based at least in part on receiving the request, the BS may provide an indication of already allocated TRS or CSI-RS resources that the UE may use when in the idle mode or inactive mode. In some aspects, the BS may allocate new TRS or CSI-RS resources for the UE to use when in the idle mode or inactive mode. Additionally, or alternatively, the BS may determine that sufficient resources are unavailable, and may reject the UE request. In this way, the BS and the UE communicate to enable communication in an idle mode or an inactive mode. Moreover, by enabling the BS to dynamically assign or allocate TRS or CSI-RS resources to the UE, the BS enables paging without a delay associated with using an infrequent SSB block for providing information to receive paging.

Figure 3:
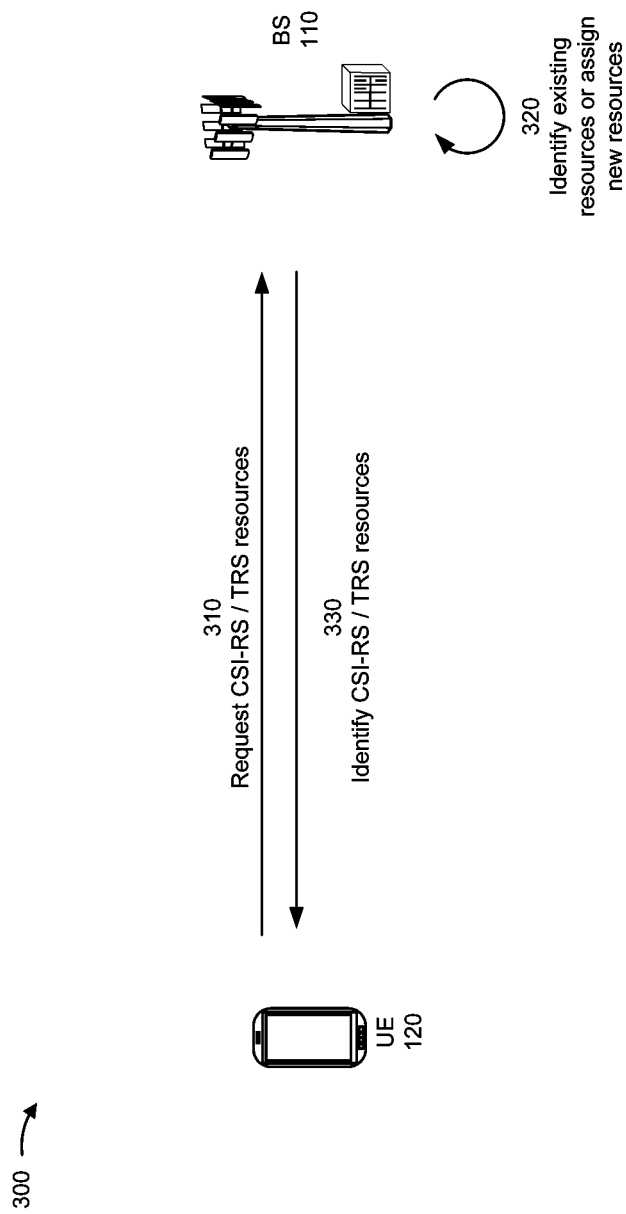
FIG. 3 is a diagram illustrating an example of reference signal resource configuration, in accordance with various aspects of the present disclosure.

FIG. 3 is a diagram illustrating an example 300 of reference signal resource configuration, in accordance with various aspects of the present disclosure.

As shown in FIG. 3, and by reference number 310, UE 120 may request reference signal resources. For example, UE 120 may request CSI-RS resources, TRS resources, and/or the like to enable channel estimation, cell selection, and/or the like for receiving subsequent paging in an idle mode or inactive mode. In some aspects, UE 120 may request the reference signal resources when operating in an idle mode or an inactive mode. For example, UE 120 may initiate a RACH procedure by transmitting a RACH preamble using RACH resources allocated for requesting reference signal resources. In another example, UE 120 may initiate a RACH procedure using common RACH resources, and may transmit a request for the reference signal resources using a message-3 transmission associated with the RACH procedure. In these cases, by transmitting a RACH transmission to request the reference signal resources, UE 120 may avoid triggering an RRC resume procedure or an RRC connection re-establishment procedure, thereby avoiding an excessive use of power resources.

In some aspects, at a previous time, BS 110 may provide information identifying time resources, frequency resources, and/or the like for a RACH occasion in which UE 120 may transmit the RACH transmission. Additionally, or alternatively, BS 110 may provide information identifying a RACH preamble sequence to use for the RACH occasion. In some aspects, BS 110 may provide the information identifying the RACH occasion and the RACH resources associated therewith using a master information block (MIB), a system information block (SIB), and/or the like.

In some aspects, when the UE 120 transmits a request for the reference signal resources using a message-3 transmission during a RACH procedure, the request may be formatted as a higher-layer signaling message similar to a system information request message, which is used by the UE 120 to request an on-demand system information from the BS 110.

In some aspects, UE 120 may, when operating in a connected mode, transmit the request for reference signal resources (e.g., to subsequently use when in an idle mode or inactive mode). For example, UE 120 may transition to the connected mode and may transmit the request after transitioning to the connected mode. In this case, UE 120 may use RRC signaling, MAC CE signaling, UCI signaling, and/or the like. In some aspects, UE 120 may transition to the connected mode for another functionality and may transmit the request in addition to performing the other functionality. For example, UE 120 may transition to the connected mode for tracking, for a radio access network (RAN)-based notification area (RNA) update, and/or the like and may utilize resources allocated for use in the connected mode to request the reference signal resources for subsequent use in an idle mode or an inactive mode. In this case, UE 120 may use dedicated signaling to request the reference signal resources or may use other signaling (e.g., RNA update signaling) to implicitly indicate the request for reference signaling resources. Additionally, or alternatively, UE 120 may perform a dedicated transition to the connected mode to transmit the request for the reference signal resources using dedicated signaling.

As shown in FIG. 3, and by reference number 320, BS 110 may identify existing reference signal resources or allocate new reference signal resources for UE 120. For example, BS 110 may receive the RACH transmission from UE 120 (e.g., when UE 120 is in an idle mode or an inactive mode) or another type of transmission from UE 120 (e.g., when UE 120 is in a connected mode) and may determine reference signal resources for use by UE 120. In some aspects, when CSI-RS resources or TRS resources are available, BS 110 may identify the existing CSI-RS resources or TRS resources for use by UE 120. For example, BS 110 may determine that TRS resources are allocated for use by connected mode UEs and may indicate to UE 120 that UE 120 may use the TRS resources when in an idle mode or inactive mode. Additionally, or alternatively, BS 110 may allocate new CSI-RS resources or TRS resources. Additionally, or alternatively, BS 110 may determine that there are no available slots and/or symbols and may reject the request for reference signal resources. In this case, BS 110 may refrain from transmitting signaling to UE 120 identifying reference signal resources or, for example, indicating a rejection of the request.

As shown in FIG. 3, and by reference number 330, UE 120 may selectively receive information identifying reference signal resources. For example, UE 120 may receive signaling from BS 110 identifying existing reference signal resources, newly allocated reference signal resources, and/or the like. Additionally, or alternatively, UE 120 may not receive signaling based at least in part on BS 110 rejecting the request. In some aspects, based at least in part on receiving signaling identifying the reference signal resources, UE 120 may receive a reference signal, thereby enabling channel estimation, cell selection, and/or the like for a paging occasion.

As indicated above, FIG. 3 is provided as an example. Other examples may differ from what is described with respect to FIG. 3.

Figure 4:
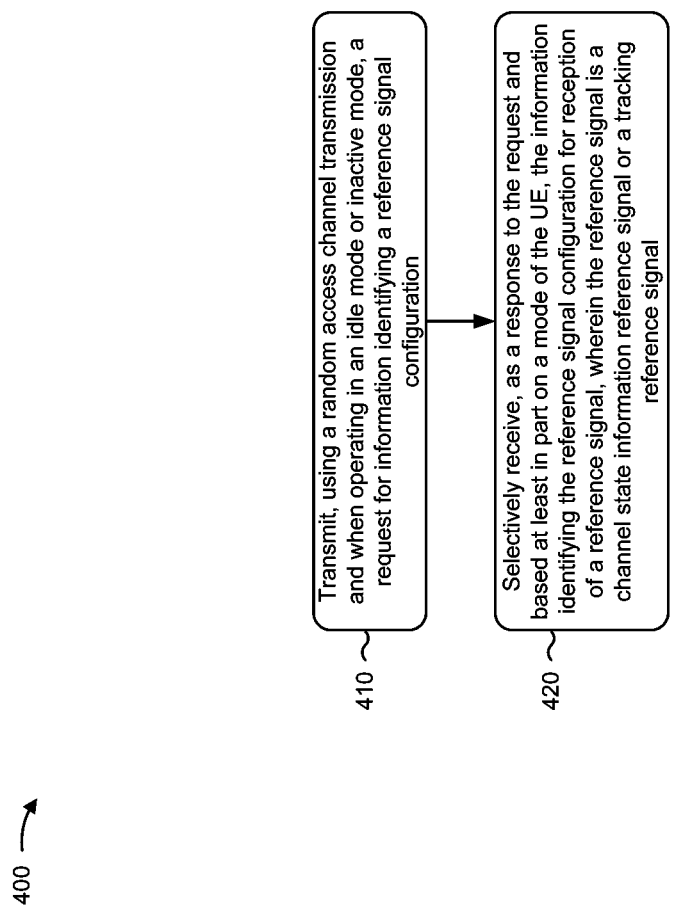
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with reference signal resource configuration.

As shown in FIG. 4, in some aspects, process 400 may include transmitting, using a random access channel transmission and when operating in an idle mode or inactive mode, a request for information identifying a reference signal configuration (block 410). For example, the UE (e.g., using controller/processor 280, transmit processor 264, TX MIMO processor 266, MOD 254, antenna 252, and/or the like) may transmit, using a random access channel transmission and when operating in an idle mode or inactive mode, a request for information identifying a reference signal configuration, as described above.

As further shown in FIG. 4, in some aspects, process 400 may include selectively receiving, as a response to the request and based at least in part on a mode of the UE, the information identifying the reference signal configuration for reception of a reference signal, wherein the reference signal is a channel state information reference signal or a tracking reference signal (block 420). For example, the UE (e.g., using antenna 252, DEMOD 254, MIMO detector 256, receive processor 258, controller/processor 280, and/or the like) may selectively receive, as a response to the request and based at least in part on a mode of the UE, the information identifying the reference signal configuration for reception of a reference signal, as described above. In some aspects, the reference signal is a channel state information reference signal or a tracking reference signal.

Process 400 may include additional aspects, such as any single aspect or any combination of aspects described below and/or in connection with one or more other processes described elsewhere herein.

In a first aspect, transmitting the random access channel transmission includes transmitting the random access channel transmission using a configured set of random access channel resources.

In a second aspect, alone or in combination with the first aspect, the configured set of random access channel resources is a dedicated set of random access channel resources for requesting the information identifying the reference signal configuration.

In a third aspect, alone or in combination with one or more of the first and second aspects, the configured set of random access channel resources includes at least one of a configured time resource for a random access channel occasion, a configured frequency resource for the random access channel occasion, or a random access channel preamble sequence for the random access channel transmission.

In a fourth aspect, alone or in combination with one or more of the first through third aspects, the random access channel transmission does not trigger a radio resource control resume or connection re-establishment procedure.

In a fifth aspect, alone or in combination with one or more of the first through fourth aspects, the random access channel transmission comprises a reference signal transmission request.

In a sixth aspect, alone or in combination with one or more of the first through fifth aspects, transmitting the request for information identifying a reference signal configuration includes transmitting the request using a message-3 transmission associated with a random access procedure.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
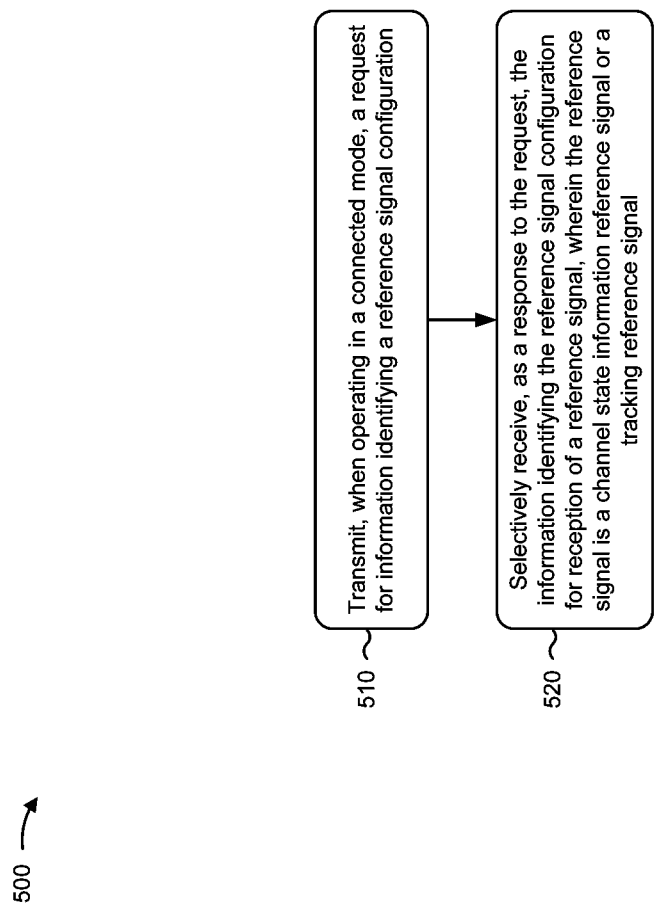
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with reference signal resource configuration.

As shown in FIG. 5, in some aspects, process 500 may include transmitting, when operating in a connected mode, a request for information identifying a reference signal configuration (block 510). For example, the UE (e.g., using controller/processor 280, transmit processor 264, TX MIMO processor 266, MOD 254, antenna 252, and/or the like) may transmit, when operating in a connected mode, a request for information identifying a reference signal configuration, as described above.

As further shown in FIG. 5, in some aspects, process 500 may include selectively receiving, as a response to the request, the information identifying the reference signal configuration for reception of a reference signal, wherein the reference signal is a channel state information reference signal or a tracking reference signal (block 520). For example, the UE (e.g., using antenna 252, DEMOD 254, MIMO detector 256, receive processor 258, controller/processor 280, and/or the like) may selectively receive, as a response to the request, the information identifying the reference signal configuration for reception of a reference signal, as described above. In some aspects, the reference signal is a channel state information reference signal or a tracking reference signal.

Process 500 may include additional aspects, such as any single aspect or any combination of aspects described below and/or in connection with one or more other processes described elsewhere herein.

In a first aspect, transmitting the request includes transmitting the request using at least one of: a radio resource control message, a medium access control control element, an uplink control information message, a tracking area update message, or a radio access network based notification area update message.

In a second aspect, alone or in combination with the first aspect, process 500 includes transitioning from an idle mode or inactive mode to the connected mode to perform a tracking area update or a radio access network based notification area update, and transmitting the request includes transmitting the request based at least in part on transitioning from the idle mode or the inactive mode to the connected mode.

In a third aspect, alone or in combination with one or more of the first and second aspects, process 500 includes determining to transmit the request and transitioning from an idle mode or inactive mode to the connected mode based at least in part on determining to transmit the request, and transmitting the request includes transmitting the request based at least in part on transitioning from the idle mode or the inactive mode to the connected mode.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
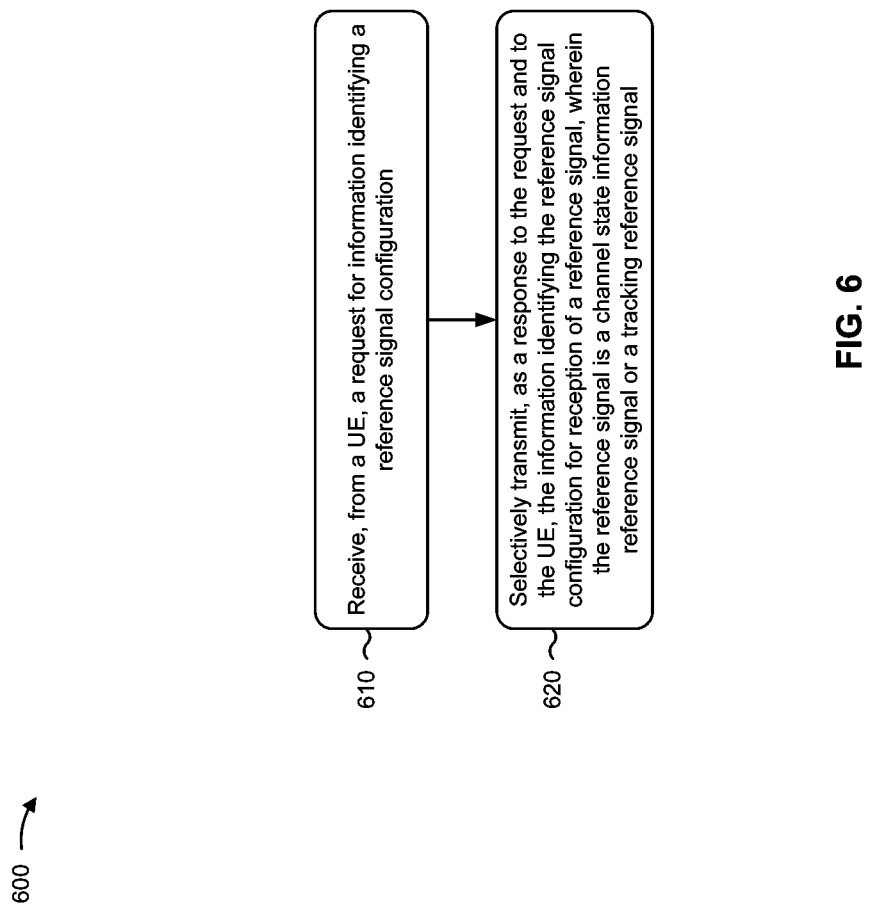
FIG. 6 is a diagram illustrating an example process performed, for example, by a base station, in accordance with various aspects of the present disclosure.

FIG. 6 is a diagram illustrating an example process 600 performed, for example, by a BS, in accordance with various aspects of the present disclosure. Example process 600 is an example where the BS (e.g., BS 110 and/or the like) performs operations associated with reference signal resource configuration.

As shown in FIG. 6, in some aspects, process 600 may include receiving, from a UE, a request for information identifying a reference signal configuration (block 610). For example, the BS (e.g., using transmit processor 220, receive processor 238, controller/processor 240, memory 242, and/or the like) may receive, from a UE, a request for information identifying a reference signal configuration, as described above.

As further shown in FIG. 6, in some aspects, process 600 may include selectively transmitting, as a response to the request and to the UE, the information identifying the reference signal configuration for reception of a reference signal, wherein the reference signal is a channel state information reference signal or a tracking reference signal (block 620). For example, the BS (e.g., using transmit processor 220, receive processor 238, controller/processor 240, memory 242, and/or the like) may selectively transmitting, as a response to the request and to the UE, the information identifying the reference signal configuration for reception of a reference signal, as described above. In some aspects, the reference signal is a channel state information reference signal or a tracking reference signal.

Process 600 may include additional aspects, such as any single aspect or any combination of aspects described below and/or in connection with one or more other processes described elsewhere herein.

In a first aspect, the UE is in an idle mode or an inactive mode, and the request is conveyed via a random access channel transmission.

In a second aspect, alone or in combination with the first aspect, the UE is in a connected mode, and the request is conveyed via at least one of a radio resource control message, a medium access control control element, an uplink control information message, a tracking area update message, or a radio access network based notification area update message.

In a third aspect, alone or in combination with one or more of the first and second aspects, process 600 includes determining a set of resources for the reference signal configuration, and selectively transmitting the information identifying the reference signal configuration includes transmitting the information identifying the reference signal configuration based at least in part on determining the set of resources for the reference signal configuration.

In a fourth aspect, alone or in combination with one or more of the first through third aspects, the set of resources are a configured set of resources for connected mode UEs, and transmitting the information identifying the reference signal configuration includes transmitting, to an idle mode or inactive mode UE, an indicator of the configured set of resources for the connected mode UEs.

In a fifth aspect, alone or in combination with one or more of the first through fourth aspects, process 600 includes determining that a configured set of resources is unavailable, and transmitting the information identifying the reference signal configuration includes transmitting, to an idle mode or inactive mode UE, an indicator of a new set of resources based at least in part on determining that the configured set of resources is unavailable.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
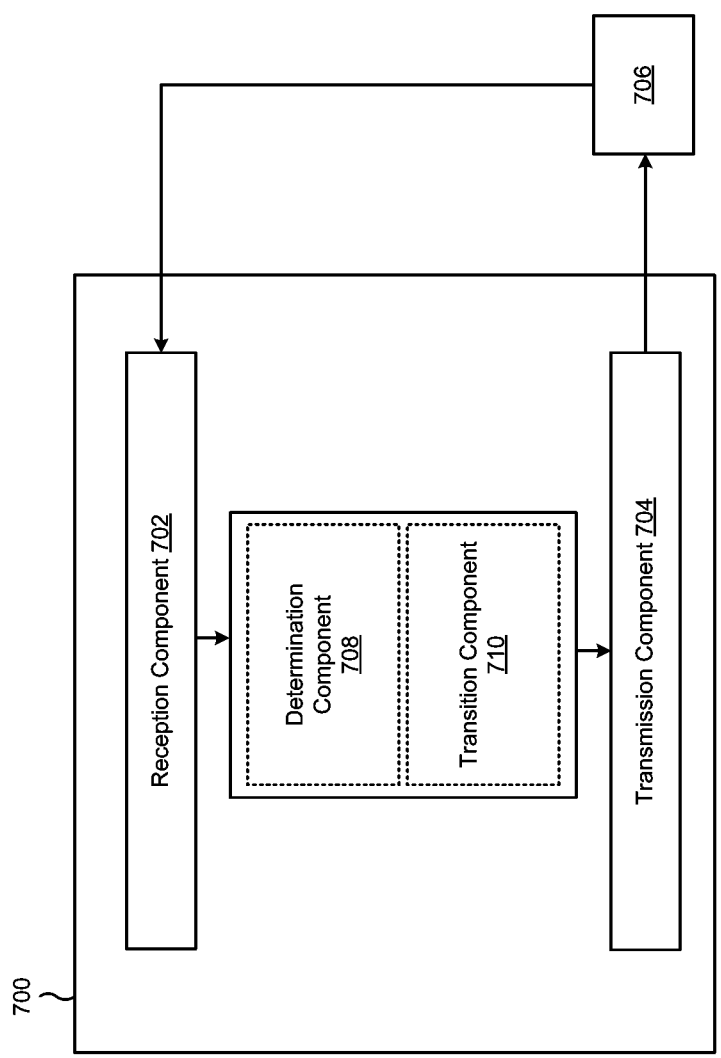
FIGS. 7 and 8 are diagrams illustrating example apparatuses, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708 or a transition component 710, among other examples.

In some aspects, the apparatus 700 may be configured to perform one or more operations described herein in connection with FIG. 3. Additionally, or alternatively, the apparatus 700 may be configured to perform one or more processes described herein, such as process 400 of FIG. 4, process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The transmission component 704 may transmit, using a random access channel transmission and when operating in an idle mode or inactive mode, a request for information identifying a reference signal configuration. The reception component 702 may selectively receive, as a response to the request and based at least in part on a mode of the UE, the information identifying the reference signal configuration for reception of a reference signal, wherein the reference signal is a channel state information reference signal or a tracking reference signal. The determination component 708 may determine whether to receive the information identifying the reference signal configuration. The determination component 708 may determine to transmit the request. In some aspects, the determination component 708 may include a receive processor, a controller/processor, a memory, or a combination thereof, of the UE described above in connection with FIG. 2.

The transmission component 704 may transmit, when operating in a connected mode, a request for information identifying a reference signal configuration. The reception component 702 may selectively receive, as a response to the request, the information identifying the reference signal configuration for reception of a reference signal, wherein the reference signal is a channel state information reference signal or a tracking reference signal.

The transition component 710 may transition from an idle mode or inactive mode to the connected mode to perform a tracking area update or a radio access network based notification area update. The transition component 710 may transition from an idle mode or inactive mode to the connected mode based at least in part on determining to transmit the request. In some aspects, the transition component 710 may include a transmit processor, a receive processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
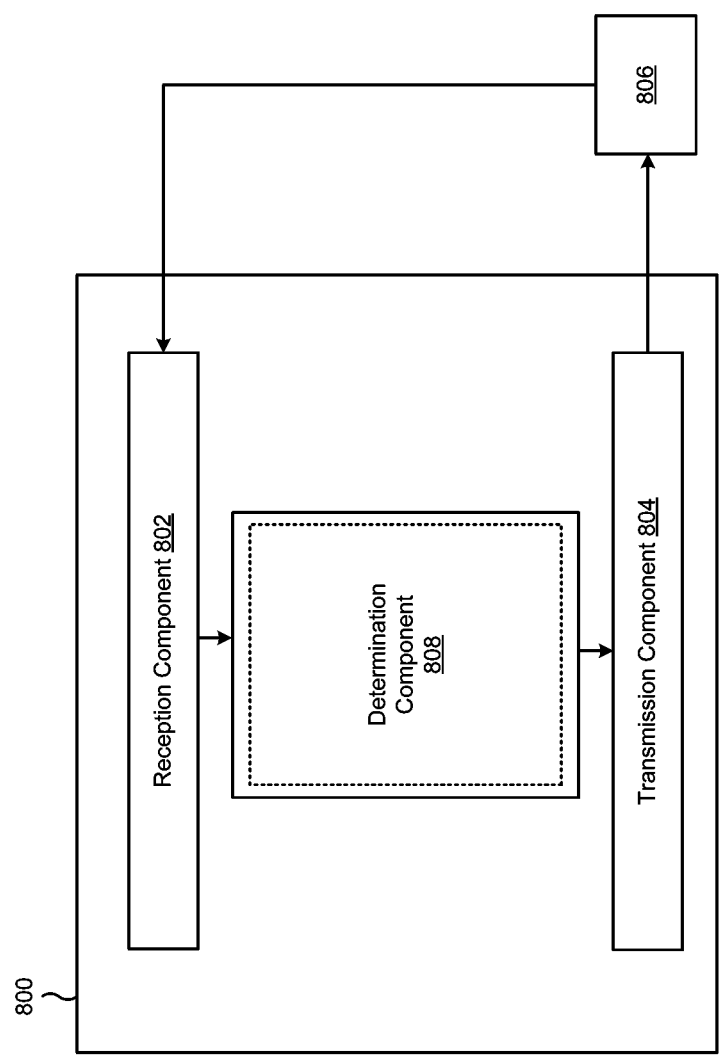

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 3. Additionally, or alternatively, the apparatus 800 may be configured to perform one or more processes described herein, such as process 600 of FIG. 6, among other examples. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The reception component 802 may receive, from a UE, a request for information identifying a reference signal configuration. The transmission component 804 may selectively transmit, as a response to the request and to the UE, the information identifying the reference signal configuration for reception of a reference signal, wherein the reference signal is a channel state information reference signal or a tracking reference signal.

The determination component 808 may determine a set of resources for the reference signal configuration. The determination component 808 may determine that a configured set of resources is unavailable. In some aspects, the determination component 808 may include a transmit processor, a receive processor, a controller/processor, a memory, or a combination thereof, of the BS described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, using a random access channel transmission and when operating in an idle mode or an inactive mode, a request for information identifying a reference signal configuration;
    selectively receiving, as a response to the request and based at least in part on a mode of the UE, the information identifying the reference signal configuration for reception of a reference signal, wherein the reference signal is a channel state information reference signal or a tracking reference signal;
    receiving, when operating in the idle mode or the inactive mode, the reference signal based at least in part on receiving the information identifying the reference signal configuration; and
    monitoring, when operating in the idle mode or the inactive mode, for a paging message in a paging occasion based at least in part on receiving the information identifying the reference signal configuration.

2. The method of claim 1, wherein transmitting the request comprises:
    transmitting the request using a configured set of random access channel resources.

3. The method of claim 2, wherein the configured set of random access channel resources is a dedicated set of random access channel resources for requesting the information identifying the reference signal configuration.

4. The method of claim 2, wherein the configured set of random access channel resources includes at least one of:
    a configured time resource for a random access channel occasion,
    a configured frequency resource for the random access channel occasion, or
    a random access channel preamble sequence for the random access channel transmission.

5. The method of claim 1, wherein transmitting the request for information identifying a reference signal configuration comprises:
    transmitting the request using a message-3 transmission associated with a random access procedure.

6. The method of claim 1, wherein the random access channel transmission does not trigger a radio resource control resume or connection re-establishment procedure.

7. The method of claim 1, wherein the random access channel transmission comprises a reference signal transmission request.

8. A method of wireless communication performed by a user equipment (UE), comprising:
    transmitting, when operating in a connected mode, a request for information identifying a reference signal configuration;
    selectively receiving, as a response to the request, the information identifying the reference signal configuration for reception of a reference signal, wherein the reference signal is a channel state information reference signal or a tracking reference signal;
    receiving, when operating in an idle mode or an inactive mode, the reference signal based at least in part on receiving the information identifying the reference signal configuration; and
    monitoring, when operating in the idle mode or the inactive mode, for a paging message in a paging occasion based at least in part on receiving the information identifying the reference signal configuration.

9. The method of claim 8, wherein transmitting the request comprises:
    transmitting the request using at least one of:
        a radio resource control message,
        a medium access control control element,
        an uplink control information message,
        a tracking area update message, or
        a radio access network based notification area update message.

10. The method of claim 8, further comprising:
    transitioning from the idle mode or the inactive mode to the connected mode to perform a tracking area update or a radio access network based notification area update; and
    wherein transmitting the request comprises:
        transmitting the request based at least in part on transitioning from the idle mode or the inactive mode to the connected mode.

11. The method of claim 8, further comprising:
    determining to transmit the request;
    transitioning from the idle mode or the inactive mode to the connected mode based at least in part on determining to transmit the request; and
    wherein transmitting the request comprises:
        transmitting the request based at least in part on transitioning from the idle mode or the inactive mode to the connected mode.

12. A method of wireless communication performed by a base station (BS), comprising:
    receiving, from a user equipment (UE), a request for information identifying a reference signal configuration;
    selectively transmitting, as a response to the request and to the UE, the information identifying the reference signal configuration for reception of a reference signal, wherein the reference signal is a channel state information reference signal or a tracking reference signal;
    transmitting, when the UE is in an idle mode or an inactive mode, the reference signal based at least in part on transmitting the information identifying the reference signal configuration; and
    transmitting, when the UE is in the idle mode or the inactive mode, a paging message in a paging occasion based at least in part on transmitting the information identifying the reference signal configuration.

13. The method of claim 12, wherein the request is received when the UE is in the idle mode or the inactive mode, and wherein the request is conveyed via a random access channel transmission.

14. The method of claim 12, wherein the request is received when the UE is in a connected mode, and
wherein the request is conveyed via at least one of:
a radio resource control message,
a medium access control control element,
an uplink control information message,
a tracking area update message, or
a radio access network based notification area update message.

15. The method of claim 12, further comprising:
determining a set of resources for the reference signal configuration; and
wherein selectively transmitting the information identifying the reference signal configuration comprises:
transmitting the information identifying the reference signal configuration based at least in part on determining the set of resources for the reference signal configuration.

16. The method of claim 15, wherein the set of resources are a configured set of resources for connected mode UEs; and
wherein transmitting the information identifying the reference signal configuration comprises:
transmitting, to an idle mode or inactive mode UE, an indicator of the configured set of resources for the connected mode UEs.

17. The method of claim 15, further comprising:
determining that a configured set of resources is unavailable; and
wherein transmitting the information identifying the reference signal configuration comprises:
transmitting, to an idle mode or inactive mode UE, an indicator of a new set of resources based at least in part on determining that the configured set of resources is unavailable.

18. A user equipment (UE) for wireless communication, comprising:
a memory; and
one or more processors coupled to the memory, the one or more processors configured to:
transmit, using a random access channel transmission and when operating in an idle mode or inactive mode, a request for information identifying a reference signal configuration;
selectively receive, as a response to the request and based at least in part on a mode of the UE, the information identifying the reference signal configuration for reception of a reference signal, wherein the reference signal is a channel state information reference signal or a tracking reference signal;
receive, when operating in the idle mode or the inactive mode, the reference signal based at least in part on receiving the information identifying the reference signal configuration; and
monitor, when operating in the idle mode or the inactive mode, for a paging message in a paging occasion based at least in part on receiving the information identifying the reference signal configuration.

19. The UE of claim 18, wherein the one or more processors, when transmitting the request, are configured to:
transmit the request using a configured set of random access channel resources.

20. The UE of claim 19, wherein the configured set of random access channel resources is a dedicated set of random access channel resources for requesting the information identifying the reference signal configuration.

21. The UE of claim 19, wherein the configured set of random access channel resources includes at least one of:
a configured time resource for a random access channel occasion,
a configured frequency resource for the random access channel occasion, or
a random access channel preamble sequence for the random access channel transmission.

22. The UE of claim 18, wherein the one or more processors, when transmitting the request for information identifying a reference signal configuration, are configured to:
transmit the request using a message-3 transmission associated with a random access procedure.

23. The UE of claim 18, wherein the random access channel transmission does not trigger a radio resource control resume or connection re-establishment procedure.

24. The UE of claim 18, wherein the random access channel transmission comprises a reference signal transmission request.

* * * * *